May 21, 1935.  M. MANNHEIMER  2,002,376
SEARCHLIGHT REFLECTOR
Filed Nov. 19, 1931   2 Sheets-Sheet 1

Inventor:
Manfred Mannheimer

May 21, 1935.  M. MANNHEIMER  2,002,376
SEARCHLIGHT REFLECTOR
Filed Nov. 19, 1931  2 Sheets-Sheet 2

Inventor:
Manfred Mannheimer

Patented May 21, 1935

2,002,376

UNITED STATES PATENT OFFICE 2,002,376

SEARCHLIGHT REFLECTOR

Manfred Mannheimer, Berlin-Charlottenburg, Germany

Application November 19, 1931, Serial No. 576,109
In Germany March 16, 1931

3 Claims. (Cl. 40—130)

My invention relates to improvements in searchlights and more particularly in reflectors thereof which project luminous points such as the positive crater of an arc lamp by producing a narrow pencil of rays, the rays emanating from the focus of the reflector being reflected in the form of an almost parallel beam. Searchlights of said type generally use parabolic reflectors, since lens systems or reflectors of different curvature do not deflect the rays from the focus as a satisfyingly parallel beam, besides their other undesirable qualities, such as chromatic dispersion, fragility, multiple reflection, etc.

The object of my invention is to provide a searchlight reflector which is composed of facets of spherical mirrors, the composite reflector being fit to give a beam with a very small divergence as from a good parabolic reflector.

Spherical mirrors of small aperture, i. e. the diameter of which is small compared to their focal length, produce a beam of a very small divergence. Even, if the source of light is not at the focus itself, the source of light being located lateral to the optical axis and at the focal distance from the vertex of the mirror, the resulting reflected rays will be fairly parallel, if the lateral distance of the source of light from the optical axis and the aperture of the mirror are not too large. As for example, the aperture of the spherical mirror may be 6° relatively to the focus and the luminous point may be located so that the ray which strikes the vertex of the mirror forms an angle of 30° with the optical axis. Then, the divergence of the reflected beam (i. e. the astigmatism) will be about 48' in the plane through the focus, the mirror vertex, and the luminous point; in the rectangular plane through the optical axis, the divergence will be just about zero. If the mirror is approached to a distance of about 93.8% of the focal length from the luminous point, the divergence in both planes will be equal and amount to 24' which is equal to ½·48'.

Hence, a searchlight reflector can be composed of a number of small spherical mirrors of small aperture which practically parallelly reflect the rays emanating from the source of light. The individual mirrors may have the same or different focal lengths. A reflector according to my invention may be used wherever a parabolic reflector can be used.

For the purpose of explaining my invention several examples embodying the same have been shown in the accompanying drawings in which the same reference characters have been used in all the views to indicate corresponding parts.

In said drawings:

Fig. 4 is a diagrammatical drawing of a vertical section of a composite reflector according to my invention the individual mirrors decreasing in size from the center to the outer zones of the reflector.

Fig. 5 is a plan view of the same reflector composed of 31 individual mirrors.

Figure 1:
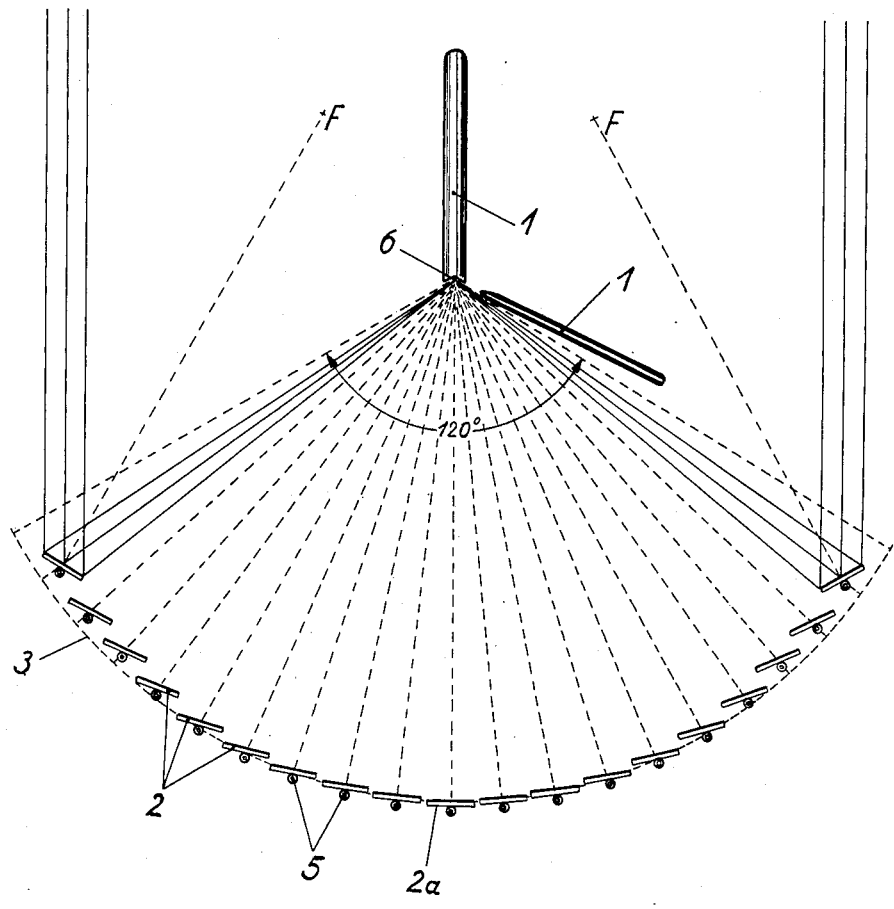
Fig. 1 is a somewhat diagrammatical vertical section of a composite reflector according to my invention, the individual mirrors having one and the same curvature.

From an arc lamp 1 using direct current as in Fig. 1 the light emission spreads principally within a space angle which corresponds to a cone of an aperture of about 120°. Therefore, the individual mirrors 2 must be arranged within this space angle. Assuming all of them to have the same focal lengths, their vertices must be located not far from a spherical segment 3 the radius of curvation of which is equal to the focal length of the mirrors. The mirrors are the more inclined to the surface of the spherical segment the more they are distant from the segment center, since all of them shall reflect the rays into the same direction. Hence, their foci F are not at one and the same place; the source of light, which is coordinated to the focus 6 of the central mirror 2a, is located lateral to the different foci of the other mirrors, the angle between the ray from the source of light to the vertex of a mirror and the connection line from the mirror vertex to the mirror focus being half of the angle of the circle arc from the central mirror to the mirror in question. The first named angle is equal to the inclination angle of the mirror relative to the surface of the spherical segment. By this reason, the mirrors of the outer zones of the reflector show an astigmatism of the reflected beam. In order to obtain the smallest possible divergence in any plane through the beam, the mirrors must be a little nearer to the source of light than the focal length.

The example embodying my invention which is shown on the left side of Fig. 1 consists in an arrangement of spherical mirrors 2 of equal focal lengths and of equal meridional apertures. This arrangement, however, can practically be used only up to an aperture of the total reflector of about 70°, since the outer mirrors shadow off part of the reflected rays from the next inner zone.

Figure 2:
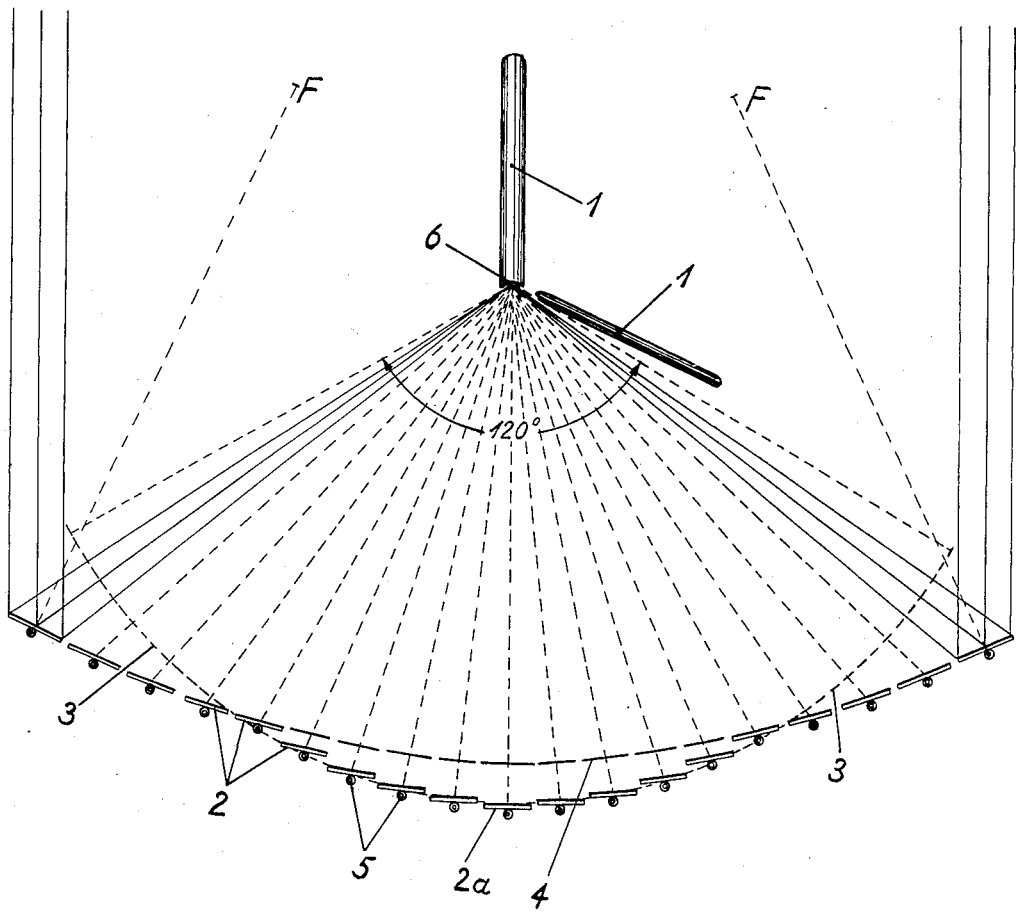
Fig. 2 is a vertical section of a similar composite reflector, the individual mirrors having 5 different curvatures.

If a greater aperture of the reflector than 70° is wanted, the arrangement shown on the right side of Fig. 2 can be used. In this arrangement, the vertices of the outer mirrors are located on a paraboloid zone the outer mirrors having focal lengths which increase to the outer zones. In the special arrangement shown on the right side of Fig. 1, mirrors of a meridional aperture of 6° relative to the source of light and of five different focal lengths are used. Curve 4 is the completion of the parabola to its vertex. The individual mirrors may be of polygonal form so that as narrow gaps as possible are left between them.

A reflector as shown in Fig. 1 or Fig. 2 can be used in an ordinary searchlight provided that the individual mirrors reflect the light into the same direction. Then, it may be used wherever a parabolic or a Mangin mirror may be used.

Figure 3:
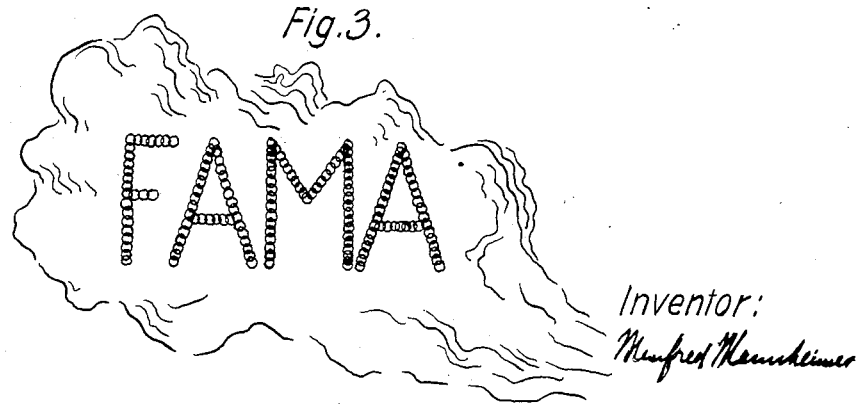
Fig. 3 shows how a sign or picture can be composed by the projections of a luminous point which are produced by the specially adjusted mirrors of either the composite reflector of Fig. 1 or of that of Fig. 2 or of a similar one corresponding to this invention.

On the other hand, the individual mirrors may be tilted around the universal joints 5 and be adjusted so that the individual projections of the crater of the arc lamp do not coincide but form a sign or a picture as shown in Fig. 3. In this case, the composite reflector may be used for projecting signs, for instance for advertising purposes, onto remote screens such as clouds or mountain sides.

If the composite reflector shall not be mainly used to project signs but for replacing a searchlight reflector of parabolic shape, it is inappropriate to use individual mirrors of one and the same meridional aperture as in Fig. 1 or Fig. 2. The main diffusion of the beam from the total reflector is caused by the astigmatism of the outer zones, relative to which the diffusion by spherical aberration is irrelevant on account of the small aperture of the individual mirrors. small number of individual mirrors which have to be individually adjusted is desirable.

Therefore, a composite searchlight reflector will be efficient, if its central mirror $Z_4$, Fig. 4 and Fig. 5, is relatively large, the width of the individual mirrors of the outer zones $Z_3$, $Z_2$, $Z_1$ decreasing from the center to the margin of the reflector. The spherical aberration of the central mirror must be just about equal to the spherical aberration of each outer mirror plus its astigmatism and must be equal to the astigmatism of the mirrors of the marginal zone as far as the order of magnitude is concerned. The central mirror is practically free of astigmatism, the mirrors of the marginal zone are practically free of spherical aberration.

The light from a source at the focus of the reflector of Figs. 2 and 3 will be reflected in a beam the divergence of which is practically not greater than the divergence of a beam reflected by the reflector of Fig. 1; the number of individual mirrors of the first named reflector is considerably smaller than the number of the individual mirrors of the reflector of Fig. 1 or Fig. 2. Thus, using the first named reflector, the loss of light by the narrow gaps between the individual mirrors is smaller, too. The mirrors of the reflector of Figs. 4 and 5 are suitably located on a paraboloid segment, through they must not necessarily. As for example, assuming the total diameter of a composite reflector to be 640 mm. and the focal length of the central mirror to be 275 mm., four zones of the reflector are sufficient, the central mirror having an aperture of 40°, the second zone having a width of 20°, the third zone $Z_2$ having a width of 11°, and the marginal zone having a width of 9°. The reflector is composed of mirrors of four different shapes and of four different focal lengths, the total number of mirrors being 31. If the total diffusion of the reflector is computed, i. e. the divergence of the reflected beam originally emanated from a luminous point at the focus 6, it is found to be about 30′. This means, on a remote object, a luminous point as the source of light of the searchlight would illuminate a spot of the size of the full moon. Since actually an extended source of light, for example the positive crater of an arc lamp, is used this source of light giving a diffusion of the beam on account of its not being limited to a point but covering a certain area which amounts to about one to two degrees, the slight additional diffusion of half a degree by the reflector does not matter practically. Moreover, the ordinary parabolic reflectors show a diffusion of the same order of magnitude.

On account of the small size of the individual mirrors they may be relatively thin in comparison to ordinary parabolic mirrors. By this reason and by the subdivision of the reflector into facets, the reflector of my invention resists much more heat than an ordinary reflector. Hence a composite reflector of 640 mm. diameter and 275 mm. focal length as described above may be combined with the most intense sources of light used for searchlights, for instance a 300 amperes arc lamp which formerly required reflectors up to 2000 mm. diameter.

Thus, the advantage of my invention is not only that a reflector for searchlights can be composed of merely spherical mirrors instead of using an expensive parabolic reflector, but that the composite reflector is much more heat resistant, that there is no reduction of brightness through multiple reflection on account of the small thickness of mirror glass compared to the greater thickness of a parabolic reflector, that therefore, the strongest known arc lamps can be combined with relatively small reflectors. It might be even possible to make the individual mirrors of special heat resisting glass such as pyrex or the like, which is impossible with big glass plates which are used as raw material for large parabolic reflectors.

In Fig. 4 and Fig. 5 an example is shown, how the individual mirrors can be adjusted to reflect the light into a desired direction. The mirrors are mounted on universal joints 5 and can be adjusted around two crossed axes by the micrometer screws 8. The total arrangement is fixed to a ground plate 9.

I wish it to be understood that I do not limit myself to the manner of adjusting the mirrors described herein, nor do I limit myself to any special form of the ground plate, nor to a special shape of the mirrors to fit together.

In a similar way as projecting a sign by means of a composite reflector according to Fig. 3, the mirrors of the reflector shown in Fig. 4 and Fig. 5 can be adjusted to produce a flat beam of light for use in lighting the skyline, or a harbour, or an airplane landing field, and also for enabling the light to be thrown through a narrow loophole or slit, so that only a very small area of the reflector is exposed, thus reducing the chances of it being hit by rifle fire, etc. The mirrors can also be adjusted to produce a divided beam at any desired angle to one another, for instance for lighting up the buoys at the sides of a canal without disturbing an approaching ship, thus rendering diverging lenses or similar devices unnecessary.

I claim:

1. Composite searchlight reflector comprising a plurality of spherical mirrors and means for individually adjusting said mirrors in any desired directions, the vertices of the mirrors having such positions relative to a given point (6) on the axis of the total arrangement of mirrors, that the distance of the vertex of each mirror from said point is equal to the focal length of the mirror in question.

2. Composite searchlight reflector comprising a plurality of spherical mirrors and means for individually adjusting said mirrors in any desired directions, the vertices of the mirrors having such positions relative to a given point (6) on the axis of the total mirror arrangement, that the distance of the vertex of each mirror from said point is a little smaller than the focal length of the mirror in question, being the smaller the more distant said vertex is from said axis.

3. Composite searchlight reflector comprising a plurality of spherical mirrors and means for individually adjusting said mirrors in any desired directions, the vertices of the mirrors having such positions relative to a given point (6) on the axis of the total mirror arrangement, that the distance of the vertex of each mirror from said point is a little greater than the focal length of the mirror in question, being the greater the more distant said vertex is from said axis.

MANFRED MANNHEIMER.